United States Patent
Peng et al.

(10) Patent No.: US 7,102,886 B2
(45) Date of Patent: Sep. 5, 2006

(54) COMPUTER ENCLOSURE INCORPORATING SLIDABLE DRIVE BRACKET

(75) Inventors: Wen-Tang Peng, Tu-cheng (TW); Guang-Yi Zhang, Shenzhen (CN)

(73) Assignee: Hon Hai Precision Industry Co., Ltd., (TW)

( * ) Notice: Subject to any disclaimer, the term of this patent is extended or adjusted under 35 U.S.C. 154(b) by 0 days.

(21) Appl. No.: 10/990,079

(22) Filed: Nov. 16, 2004

(65) Prior Publication Data

US 2005/0128699 A1    Jun. 16, 2005

(30) Foreign Application Priority Data

Dec. 10, 2003    (CN) .................. 2003 2 0119237

(51) Int. Cl.
*G06F 1/16*    (2006.01)
(52) U.S. Cl. ................ 361/685; 248/298.1; 312/223.2; 211/26
(58) Field of Classification Search ........ 361/679–687, 361/724–727; 312/334.16, 223.1–223.6; 174/66; 211/26; 248/298.1
See application file for complete search history.

(56) References Cited

U.S. PATENT DOCUMENTS 5,332,306 A     7/1994    Babb et al. ............ 312/334.16
6,826,044 B1*   11/2004   Gan et al. .................... 361/685
2003/0202321 A1* 10/2003  Lin et al. ..................... 361/685
2005/0094369 A1*  5/2005  Chen et al. .................. 361/685

FOREIGN PATENT DOCUMENTS

TW             435923           5/2001

\* cited by examiner

*Primary Examiner*—Hung Van Duong
(74) *Attorney, Agent, or Firm*—Morris Manning & Martin LLP; Tim Tingkang Xia, Esq.

(57) ABSTRACT

A computer enclosure includes a cage (10), and a drive bracket (30). The cage has a pair of side panels (14a, 14b), and a front panel (16). Each of the side panel defines a first slideway (21) and a second slideway (25). The front panel defines a screw hole (28). The drive bracket includes a pair of side walls (36). Each side wall attachingly receives a first sliding member (50) and a locking member (70), and forms a second sliding member (40). A slot (26) is defined in each of the second slideway. The locking member includes a protrusion (78) defining a through hole (80). In assembly, the drive bracket is pushed into the cage, with the second and first sliding member sliding along the second and the first slideways. A thumbscrew (90) is extended the through hole and engages in the screw hole to secure the drive bracket in the cage.

18 Claims, 4 Drawing Sheets

COMPUTER ENCLOSURE INCORPORATING SLIDABLE DRIVE BRACKET

BACKGROUND OF THE INVENTION

1. Field of the Invention

The present invention relates to computer enclosures, and particularly to a computer enclosure having a slidable drive bracket.

2. Description of the Related Art

Various data storage devices are installed in computers for electronic communication and handling of data. Drive brackets are often used to support and secure such data storage devices inside the computers.

In a typical computer, drive brackets are fixed in an enclosure of the computer by screws or fasteners. Taiwan Patent Application No. 89216297 discloses a conventional computer enclosure comprising a cage and a bracket. The cage defines a plurality of fixing holes, and the bracket includes a base and two separable frames. The base defines a plurality of screw holes. Fixing edges depend from two sides respectively of the frames, and the fixing edges define a plurality of fixing openings. A plurality of setscrews is extended through the fixing openings of the fixing edges and engaged in the screw holes of the base, thereby fixing the two frames to the base. A plurality of setscrews is used to fix the bracket into the cage in similar fashion.

However, using screws to mount the frame onto the base is laborious and time-consuming. In addition, when a user wants to change or maintain a component in the computer, removal of the screws is inconvenient. Similarly, using screws to attach a bracket in a computer enclosure is laborious and time-consuming. Moreover, production and assembly of these modularized brackets is complicated and costly.

Thus, a computer enclosure incorporating slidable drive bracket which solves the above-mentioned problems is strongly desired.

SUMMARY OF THE INVENTION

Accordingly, an object of the present invention is to provide a computer enclosure having a slidable drive bracket which allows quickly and readily attachment and removal of data storage devices therein.

To achieve the above-mentioned object, a computer enclosure in accordance with the preferred embodiment of the present invention comprises a cage and a bracket. The cage comprises a pair of side panels, and a front panel. Each of the side panel defines a first slideway and a second slideway. The front panel defines a screw hole. The drive bracket comprises a pair of side walls. Each side wall attachingly receives a first sliding member and a locking member, and forms a second sliding member. A slot is defined in each of the second slideway. The locking member includes a protrusion defining a through hole. In assembly, the drive bracket is pushed into the cage, with the second and first sliding member sliding along the second and the first slideways. A thumb screw is extended the through hole and engages in the screw hole to secure the drive bracket in the cage.

Other objects, advantages and novel features of the present invention will be drawn from the following detailed description of a preferred embodiment of the present invention with attached drawings, in which:

DETAILED DESCRIPTION OF THE INVENTION

Figure 1:
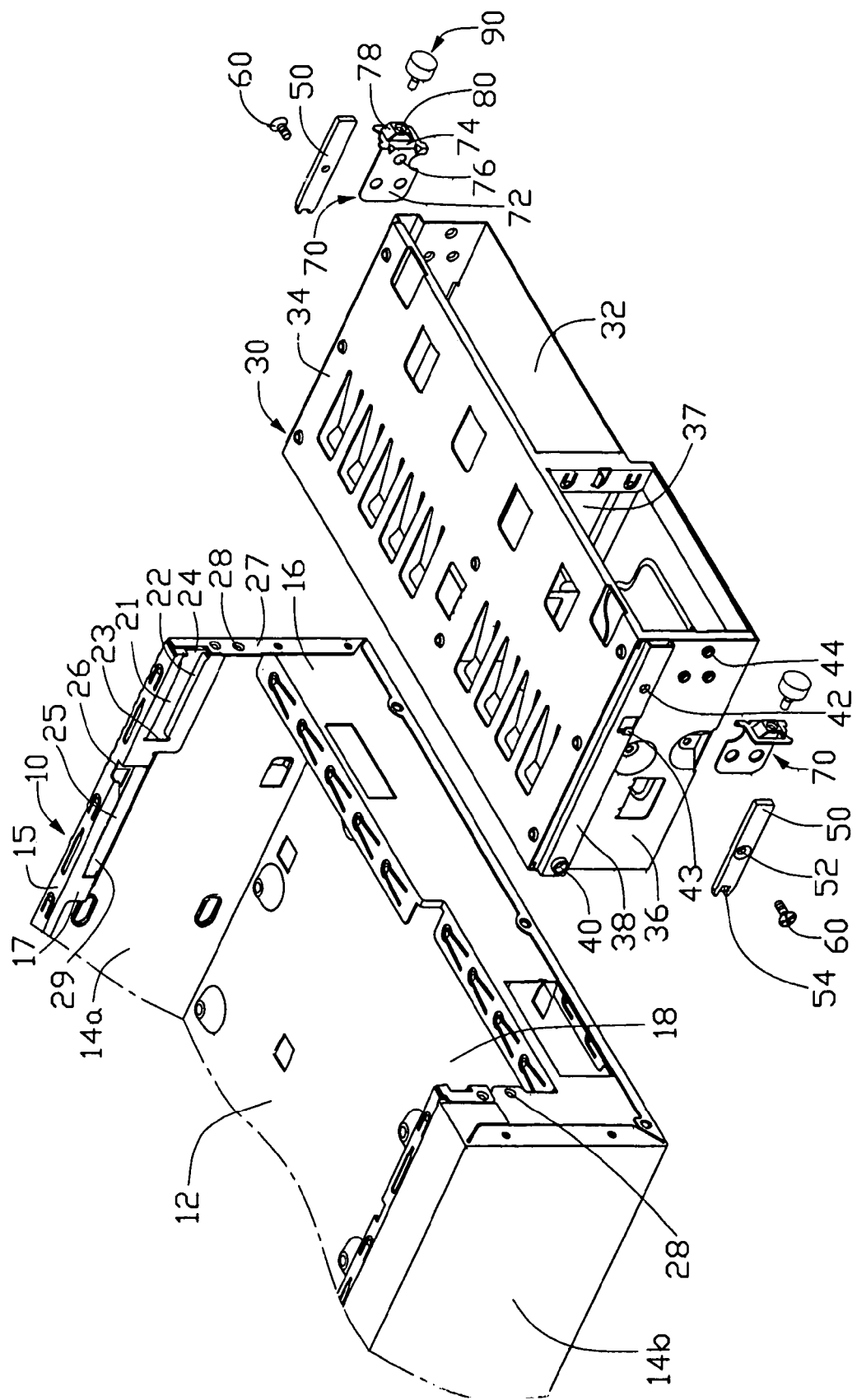
FIG. 1 is an exploded, isometric view of a computer enclosure in accordance with the present invention.

Referring to FIG. 1, a computer enclosure of an electronic device in accordance with a preferred embodiment of the present invention comprises a bracket 30, and a cage 10.

The cage 10 comprises a bottom panel 12, a front panel 16, and a pair of side panels 14a, 14b. A top extremity of the front panel 16 is lower than top extremities of the side panels 14a, 14b. An entrance 18 is thereby defined above the front panel 16 and between the side panels 14a, 14b, for receiving the drive bracket 30 therethrough. The side panels 14a, 14b have similar and symmetrical configurations; therefore, only the side panel 14a is described in detail thereafter. The side panel 14a comprises a beam 15 extending perpendicularly inwardly from a top edge thereof, and a flange 17 depending from an innermost side edge of the beam 15. A first slideway 21 is horizontally defined in a front portion of the flange 17. A second slideway 25 is horizontally defined in a rear portion of the flange 17 adjacent to the first slideway 21. A cutout 26 is defined in the beam 15, at a front end of the second slideway 25 and in communication with the slideway 25. A pair of parallel second flanges 22 extends perpendicularly from upper and lower extremities of the first slideway 21 toward the side panel 14a. The first slideway 20 comprises a blocking portion 23 at a rear extremity thereof, and an entry 24 defined in a front portion thereof. A third flange 29 extends perpendicularly outwardly from a bottom edge of the second slideway 25 toward the side panel 14a. A vertical flange 27 extends inwardly and perpendicularly from a front extremity of the side panels 14a. A pair of screw hole 28 is defined in the vertical flange 27 and a left portion of the front panel 16 beside the entrance 18 respectively. A plurality of first rivet holes 44 is defined in a front portion of the side panel 14 below the fixing wall 38.

The drive bracket 30 can be slidably received in the cage 10 along the first and second slideways 21, 25. The drive bracket 30 has a pair of side walls 36, an upper wall 34, a bottom wall 32, and a separating wall 37 parallel to and disposed at approximately midway between the side walls 36. The side walls 36 and separating wall 37 cooperatively define a pair of spaces therebetween, for holding data storage device therein. The side walls 36 protrude progressively outwardly from bottom to top, thereby forming a pair of fixing wall 38. A fixing hole 42 is defined in a front portion of each fixing wall 38. A hook 43 is outwardly formed from each fixing wall 38 behind the fixing hole 42.

A pair of first sliding members 50 is attached on front portions of the fixing walls 38 respectively. Each first sliding member 50 is elongated. A recess 54 is defined at a rear end of the first sliding member 50, corresponding to the hook 43 of the drive bracket 30. A through hole 52 is defined in a middle portion of the first sliding member 50, for extension of a setscrew 60 therethrough.

A pair of second sliding member 40 is outwardly formed from rear portions of the fixing wall 38 respectively. Each second sliding member 40 is directly punched from its corresponding fixing wall 38, and is substantially a hollow cylinder.

A pair of locking member 70 is attached to the side panels 14a, 14b of the cage 10 respectively. Each locking member 70 comprises a first plate 72, and a second plate 74 perpendicular to the first plate 72. A plurality of second rivet holes 76 is defined in the first plate 72, corresponding to the first rivet holes 44 of the side panels 36 of bracket 30. A protrusion 78 is extruded outwardly from the second plate 74. A screw hole 80 is defined in the protrusion 78, for engaging with a thumbscrew 90.

Figure 2:
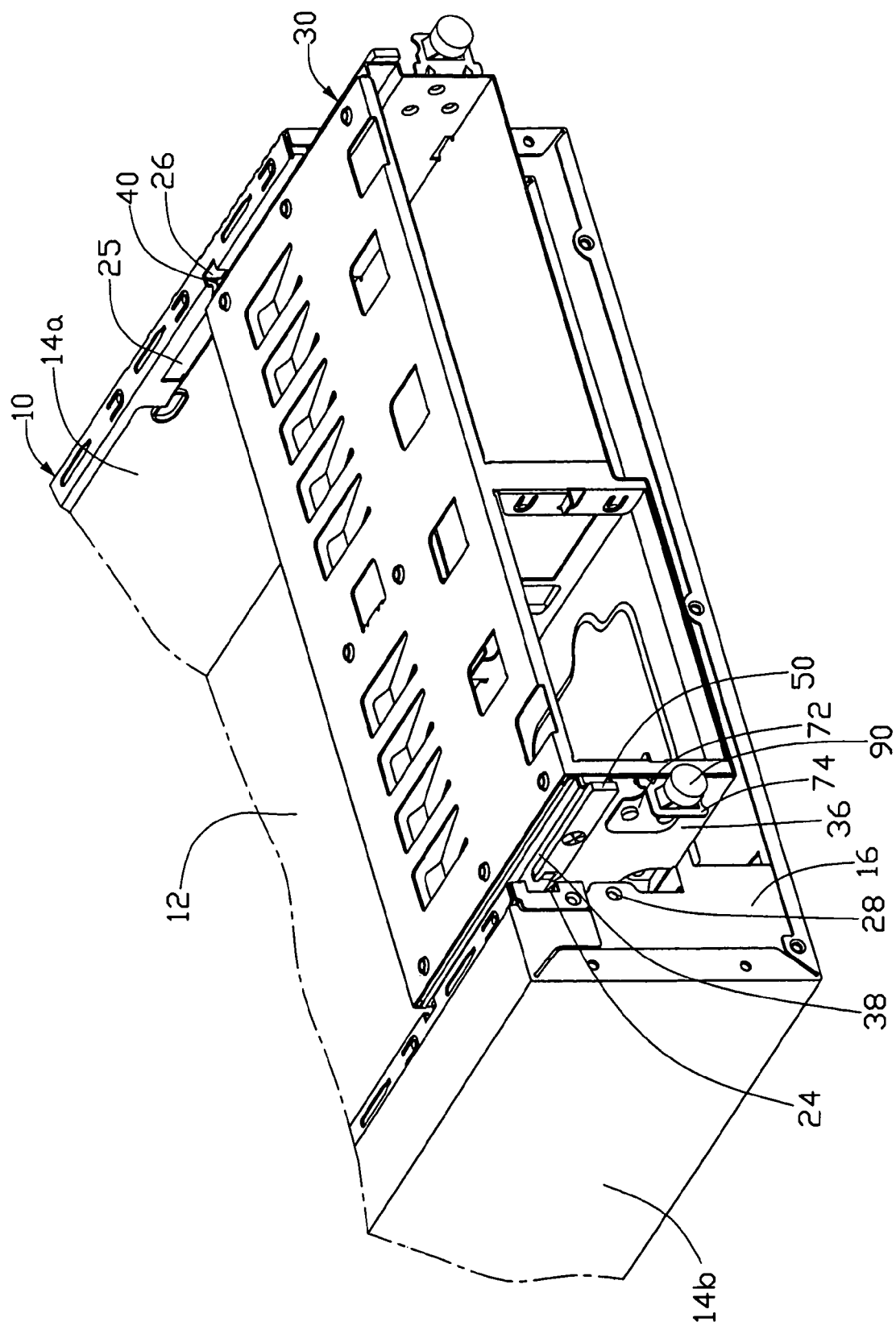
FIG. 2 is an assembly view of FIG. 1, but showing a drive bracket in an initial position.
Figure 3:
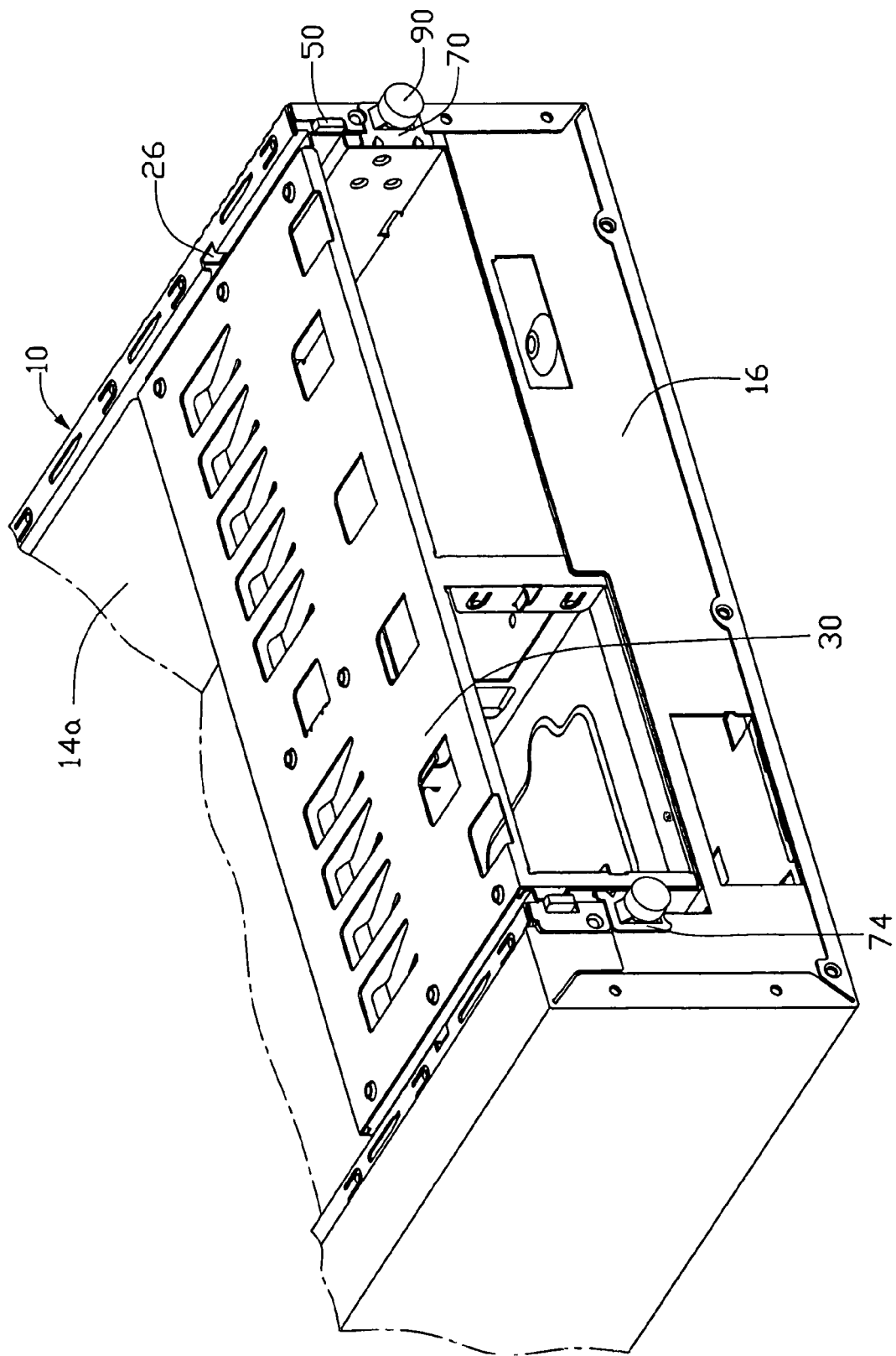
FIG. 3 is similar to FIG. 2, but showing the drive bracket in a final position.

Referring also to FIGS. 2 and 3, in assembly, each first sliding member 50 is placed against its corresponding fixing wall 38 of the drive bracket 30, so that the recess 54 of the first sliding member 50 receives the hook 43 of the corresponding fixing wall 38. The setscrew 60 is then extended through the through hole 52 of the first sliding member 50 and engages in the fixing hole 42 of the corresponding fixing wall 38. The first sliding member 50 are thus fixed to the drive bracket 30. The locking members 70 are rivetedly attached to side panels 14a, 14b of the cage 10 respectively, with the first rivet holes 76 aligning with the second rivet holes 44. The thumbscrews 90 are extended through the apertures 80 of the locking members 70 respectively. The second sliding members 40 of the drive bracket 30 are then inserted through corresponding cutouts 26 of the cage 10. The drive bracket 30 is then pushed into the cage 10, with the second sliding member 40 sliding along the second slideways 25, and the first sliding members 50 sliding along the first slideways 21 via corresponding entries 24. When the first sliding members 50 contact the blocking portions 23 of the first slideways 21 respectively, the thumbscrews 90 are screwed in the screw holes 28 of the cage 10 respectively. The drive bracket 30 is thereby secured in the cage 10, and is prevented from being accidentally detached from the cage 10.

In disassembly, the thumbscrews 90 are unscrewed to disengage from the screw holes 28 of the cage 10. The bracket 30 is then easily slide out and removed from the cage 10.

Figure 4:
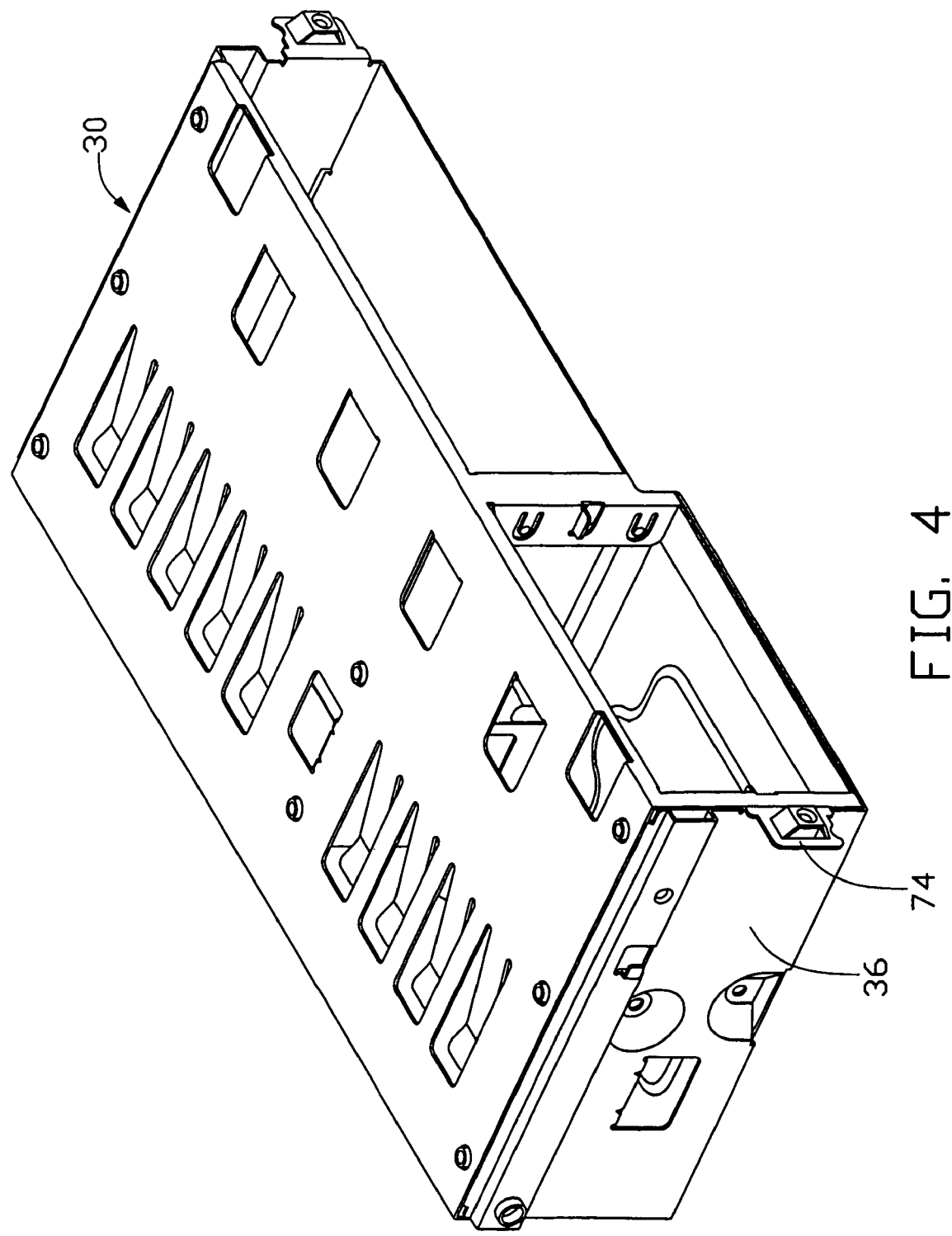
FIG. 4 is a second embodiment of the drive bracket integrated with a locking member.

Referring also to FIG. 4, in an alternative embodiment, the locking member 70 can be omitted, and a locking tab 74 is stamped outwardly from each side wall 36 of the bracket 30.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:
   a cage comprising a pair of side panels, and a front panel, each of the side panels comprising a first slideway, a screw hole defined in the front panel;
   a drive bracket slidably received in the cage, the drive bracket comprising two side walls;
   a pair of first sliding members attached to respective side walls and sliding along the first slideway, each of the first sliding members defining a fixing hole and forming a hook, for being attached to a corresponding side walls of the drive bracket;
   at least one locking member attached to one of the sidewalls of the bracket, the locking member comprising a protrusion with a through hole; and
   a thumbscrew extended the through hole to engage in the screw hole of the cage.

2. The computer enclosure as claimed in claim 1, wherein each of the side panels of the cage further comprises a second slideway in alignment with the first slideway, and each of the side walls of the drive bracket comprises a second sliding member slidably received in a corresponding second slideway.

3. The computer enclosure as claimed in claim 1, wherein each of the first sliding members defines a recess at a rear end thereof; the recess engagingly receiving the hook of a corresponding side wall of the drive bracket.

4. The computer enclosure as claimed in claim 2, wherein each of the side panels of the cage further comprises a horizontal beam and a first flange depending from the beam, and corresponding first and second slideways are defined at the first flange.

5. The computer enclosure as claimed in claim 3, wherein each of the first sliding members defines a through hole in a middle portion thereof.

6. The computer enclosure as claimed in claim 4, wherein each of the beams defines a cutout in communication with a corresponding second slideway.

7. A computer enclosure comprising:
   a cage comprising a pair of spaced opposite side panels, each of said side panels defining spaced first and second slideways, at least one of said side panels perpendicularly extending a flange, a fastening hole defined in the flange;
   a cutout formed in each of said side panels to communicate with the corresponding first slideway;
   a drive bracket comprising a pair of spaced side walls, each of said side walls comprising spaced first and second slide members;
   at least one locking tab integrately formed on one of side walls of the drive bracket, the locking tab comprising a protrusion defining a through hole; and
   a fastener extended through the through hole and engaging in the fastening hole of the cage; wherein
   the drive bracket is able to be assembled to the cage initially at an angle to have the first slide member enter the first slideway via the corresponding cutout and have the second slide member spaced far away from the second slideway without interference, the first slide member move along the first slideway and the second slide member move along the second slideway until the first slide member contacts a rear edge of the first slideway, the fastener engages in the fastening hole to secure the drive bracket in the cage.

8. The computer enclosure as claimed in claim 7, wherein each of the first sliding members defines a fixing hole and forms a hook, for attached to a corresponding side walls of the drive bracket.

9. The computer enclosure as claimed in claim 7, wherein the second sliding member is outwardly formed from rear portions of the side wall of the drive bracket respectively and substantially a hollow cylinder.

10. The computer enclosure as claimed in claim 7, wherein the fastener is a thumbscrew.

11. The computer enclosure as claimed in claim 8, wherein each of the first sliding members defines a recess at a rear end thereof, the side wall of the drive bracket forms a hook, for engaging in corresponding recess of the first sliding member.

12. An enclosure of an electronic device comprising:
   a cage comprising a space accessible from a first and second direction, and a first side panel defined beside said space and comprising a first slideway accessible along said first direction and a second slideway accessible along said second direction, a threaded hole defined in a second side panel perpendicular to said first side panel;

a drive bracket slidably movable into said cage to stay in said space, and comprising a first sliding member adapted to be receivable in said first slideway by approaching said first slideway along said first direction, and a second sliding member adapted to be receivable in said second slideway by approaching said second slideway along said second direction, said drive bracket accessible into said space by means of receipt of said first and second sliding members in said first and second slideways, said drive bracket further comprising a locking member corresponding to said second side panel of said cage and defining a through hole therein; and a fastener extending through said through hole of said locking member and engaging in said threaded hole of said second side panel.

13. The enclosure as claimed in claim 12, wherein said second slideway is L-shaped and defines a cutout in said second direction communicating with said second slideway.

14. The enclosure as claimed in claim 12, wherein said second sliding member receives in said second slideway before said first sliding member receives in said first slideway.

15. The enclosure as claimed in claim 12, wherein said first sliding member is an elongated part attached to said drive bracket.

16. The enclosure as claimed in claim 12, further comprising a locking member attached to said drive bracket to allow fixation of said drive bracket to said cage after said drive bracket moves in said space.

17. The enclosure as claimed in claim 12, wherein said locking member is removably attachable to a sidewall of said drive bracket, said locking member comprises a protrusion, and said through hole is defined in said protrusion.

18. The enclosure as claimed in claim 12, wherein said locking member is a locking tab integrally formed at a side wall of said drive bracket, said locking tab comprising a protrusion, and said through hale is defined in said protrusion.

* * * * *